United States Patent [19]

Ishikawa et al.

[11] 4,186,427

[45] Jan. 29, 1980

[54] WIRE LENGTH ADJUSTING DEVICE OF WIRE FOR ADJUSTING HEADLIGHT BEAM

[75] Inventors: Masao Ishikawa, Yokohama; Tatuo Nakamura, Tokyo, both of Japan

[73] Assignees: Nissan Motor Company, Limited, Yokohama; Ichiko Industries Limited, Tokyo, both of Japan

[21] Appl. No.: 851,630

[22] Filed: Nov. 15, 1977

[30] Foreign Application Priority Data

Nov. 17, 1976 [JP] Japan .................... 51-153189[U]

[51] Int. Cl.² .............................................. B60Q 1/06
[52] U.S. Cl. ............................ 362/66; 362/270; 362/273; 362/274; 362/287; 362/289
[58] Field of Search ............... 362/66, 67, 68, 70, 362/270, 271, 273, 274, 287, 289

[56] References Cited

U.S. PATENT DOCUMENTS

| 1,480,221 | 1/1924 | Pomeroy et al. | 362/274 |
| 2,826,682 | 3/1958 | Falge | 362/273 |
| 2,911,522 | 11/1959 | Mears | 362/273 |
| 2,911,523 | 11/1959 | Falge et al. | 362/273 |

FOREIGN PATENT DOCUMENTS

| 1026284 | 4/1953 | France | 362/274 |
| 511530 | 8/1939 | United Kingdom | 362/273 |

Primary Examiner—Howard A. Birmiel

[57] ABSTRACT

A wire length adjusting device comprises an adjust screw threadedly engaging a nut fixed to one end of a headlight mounting frame, the other end of which is hingedly mounted to a vehicle body. The adjust screw has a head disposed within an area on outside of the headlight mounting frame. A wire for adjusting a headlight beam has one end anchored to the adjust screw and the other end operatively connected to a controller having its manually operative dial extending into the passenger compartment. A member, such as a headlight finisher or a radiator grill, mounted to the vehicle body within an area on outside of the headlight mounting frame is formed with a hole so as to permit a mating tool for turning the head of the adjust screw to reach the head of the adjust screw, whereby the wire length compensation can be carried out from the outside of the vehicle without removing the member.

3 Claims, 2 Drawing Figures

WIRE LENGTH ADJUSTING DEVICE OF WIRE FOR ADJUSTING HEADLIGHT BEAM

BACKGROUND OF THE INVENTION

The present invention relates to motor vehicles provided with a headlight beam adjusting device, and more particularly to a wire length adjusting device of a wire for adjusting a headlight beam.

A known headlight beam adjusting device comprises a headlight mounting frame having an upper end hingedly mounted to a vehicle body at a support for a radiator core; a controller having a manually operative dial; and a wire for adjusting a headlight beam operatively connecting a lower swingable end of the headlight mounting frame with the controller in such a manner that manually operating the dial causes the controller to pull the wire, causing the headlight mounting frame to pivot against the bias of a spring, or to push the wire, casing the headlight mounting frame to pivot under the bias of the spring. To adjust the wire length, an adjust screw is provided within an engine compartment. The adjust screw has a head disposed within the engine compartment and a threaded flank with a locking nut thereon. The wire length adjustment is carried out firstly by releasing the locking nut, secondly by turning the adjust screw to adjust the wire length and thirdly by tightening again the locking nut. With this known wire length adjusting device, there are problems as follows:

(1) The above-mentioned three operations required upon the wire length adjustment take a great deal of trouble and time.

(2) Since an engine hood must be opened and a radiator grill must be removed upon the wire length adjustment and the above-mentioned three operations must be carried out through narrow limited spaces available between engine components and accessories within the engine compartment, the wire length adjustment work is troublesome and its workability is bad.

(3) Since the wire length adjustment, which takes a great deal of trouble and time, is troublesome and whose workability is bad, must be carried out per right and left headlight assemblies to match each other, it takes time and requires skilled labour.

SUMMARY OF THE INVENTION

It is therefore an object of the present invention to provide a headlight beam adjusting device provided with a wire length adjusting device, in which the wire length adjustment can be carried out from the outside of a vehicle.

BRIEF DESCRIPTION OF THE DRAWINGS

The present invention will be described hereinafter in conjunction with the accompanying drawings, in which.

DETAILED DESCRIPTION OF THE PREFERRED EMBODIMENTS

Figure 1:
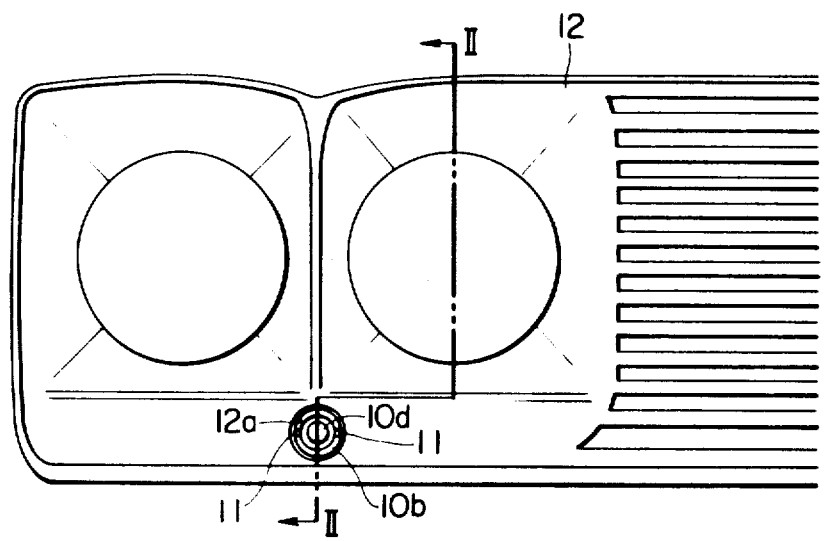
FIG. 1 is front elevational, in fragment, view of a motor vehicle.

Referring to the drawings, the reference numeral 1 denotes a vehicle body and 3 a headlight mounting frame which has an uper end thereof hingedly mounted, with a hinge 2, to the vehicle body at a support for a radiator core. Denoted by the reference numeral 4 is a controller having a manually operative dial 4a extending into a passenger compartment (not shown). A wire 5 has one end anchored to an adjust screw 10 threadedly engaging the headlight mounting frame 3 at an area adjacent a lower, swingable, end 6 thereof and has the other end thereof operatively connected to the controller 4.

The adjust screw 10 has a shank 10a formed with a male thread, a head 10b and an axial bore 10c. The wire 5 is inserted into the axial bore 10c from the shank 10a and is securely connected to a nipple end 10d which engages the bottom of a recess of the head 10b. The shank threadedly engages a nut 3a secured, such as by welding, to an area on the headlight mounting frame 3 adjacent the lower end 6 thereof. The wire length adjustment of the wire 5 can be accomplished by turning the adjust screw 10. The adjust screw 10 is turned with a suitable tool and the head 10b is formed with means for mating with the tool. In this embodiment the tool takes the form of a minus driver, while the mating means takes the form a slit 11 which is dimensioned to receive a tooth of the driver.

Denoted by the reference numeral 12 is a member, i.e., a headlight finisher or a radiator grill. The member 12 is formed with a hole 12a to permit the driver to reach the head 10b of the adjust screw 10. The provision of the hole 12a will enable us to adjust the wire length from the outside of the vehicle without removing the member 12. The hole 12a should have a minimum opening size large enough to permit the driver to reach the head 10b of the adjust screw 10 so as not to impair the external appearance of the member 12. If desired, the hole 12a is replaced with a notch.

Alternatively, the mating means takes the forms of a polygonal bore, such as a rectangular bore or a hexagonal bore. In this case, a polygonal shaped tool is used to turn the adjust screw 10. The opening size of the hole 12a can be made small because the cross sectional area of the polygonal tool mating with the polygonal bore is little smaller than that of the polygonal bore and thus is smaller than that of the head 10b of the adjust screw 10. Thus, the use of the polygonal bore as the mating means instead of the slit 11 is advantageous in that external appearance of the member 12 is less impaired.

Figure 2:
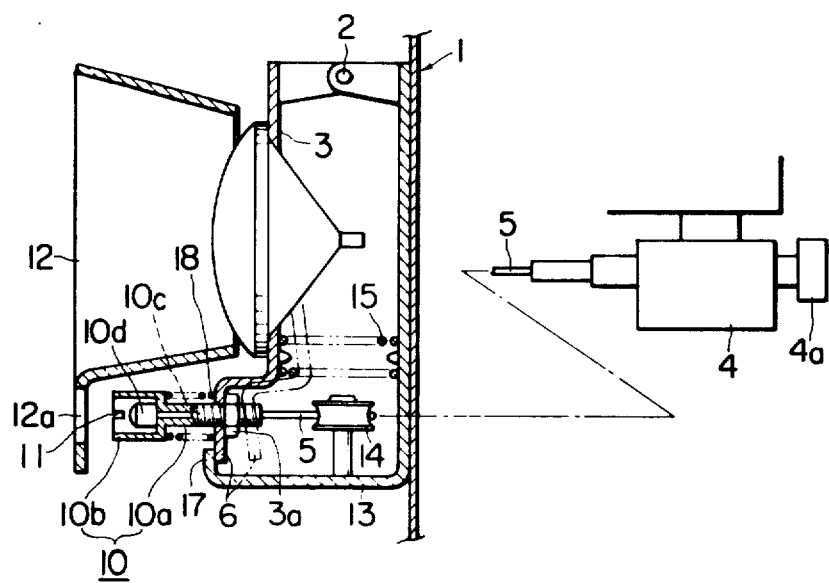
FIG. 2 is a sectional view taken through the line II—II of FIG. 1, showing a headlight beam adjusting device provided with a wire length adjusting device of the invention.

Denoted by the reference numeral 13 is a bracket having mounted thereto a pulley 14. The wire 5 extends around the pulley 14 and deflects its direction by 90 degrees. Denoted by the reference numeral 15 is a spring biasing the headlight mounting frame 3 to the position illustrated in FIG. 2, in which further outward movement of the mounting frame 3 due to the bias of the spring 15 is limited by a stopper 17 formed on the bracket 13. Denoted by the reference numeral 18 is a balancing or retaining spring.

The operation of the headlight beam adjusting device will be described.

Turning the dial 4a counter-clockwise will cause the controller 4 to push the wire 5 thereby causing the headlight mounting frame 3 to pivot clockwise (viewing in FIG. 2) under the bias of the spring 15, whereas, turning the dail 4a clockwise will cause the controller 4 to pull the wire 5 thereby causing the headlight mounting frame 3 to pivot counter-clockwise against the bias of the spring 15. In this manner headlight beam is adjusted.

Since the tension is always applied to the wire 5 by means of the spring 15 and the wire 5 is pulled to adjust the headlight beam, there occurs elongation of the wire 5 after a long use which requires adjustment. This elongation of the wire 5 can be adjusted by turning the adjust screw and turning of the adjust screw 10 is effected with the tool from the outside of the vehicle. The initial adjustment of the length of the wire upon exchanging of the wire 5 can be accomplished by turning the adjust screw 10.

It will now be understood from the preceding description that with the wire length adjusting device, the wire length adjustment can be accomplished from the outside of the vehicle, without removing the headlight finisher or without opening the engine hood, and thus is effortless.

What is claimed is:

1. In a motor vehicle:

a vehicle body;

a controller;

a headlight mounting frame having one end hingedly mounted to said vehicle body;

a wire having one end operatively connected to said controller;

an adjust screw threadedly engaging said headlight mounting frame at an area adjacent the other end of the mounting frame, said adjust screw having a head disposed on the outside of said headlight mounting frame; means for connecting one end of said wire to said adjust screw so that said screw can be rotated without rotating said wire; and a member mounted to the vehicle body and disposed on the outside of said headlight mounting frame, said member being formed with an opening to permit a mating tool for turning said adjust screw to reach the head of said adjust screw.

2. In a motor vehicle: a vehicle body having a cabin a controller disposed so as to be accessible from within the cabin;

a wire leading from said controller and which is movable in the longitudinal direction thereof in response to the operation of said controller;

a headlight mounting frame pivotally mounted to said vehicle body;

a first headlight mounted to said headlight mounting frame;

a second headlight mounted to said headlight mounting frame adjacent said first headlight;

an adjust screw having a hollow head portion and a threaded shank portion, said adjust screw having a coaxial through bore leading from said hollow head portion to the end of said threaded shank portion, said adjust screw being slidably disposed through a through hole formed in said headlight mounting frame;

a nut threadedly received on said threaded shank portion which is secured to the inboard surface of said headlight mounting frame;

said wire being disposed through said through bore so that a nipple formed on one end thereof is received in said hollow head portion;

biasing means disposed between said headlight mounting frame and said vehicle body for biasing said headlight mounting frame to pivot in one rotational direction toward a stop fixedly connected to said vehicle body;

a member fixedly mounted to said vehicle body outboard of and spaced from said headlight mounting frame, said member having first and second apertures substantially coaxial with said high beam and low beam headlights and a third aperture substantially coaxial with said adjust screw for permitting a too to be inserted therethrough for rotation of said adjust screw.

3. In a motor vehicle: a vehicle having a cabin;

a controller disposed so as to be accessible from within said cabin;

a headlight mounting frame pivotally mounted to said vehicle body;

a headlight mounted to said headlight mounting frame;

a wire leading from said controller to said headlight mounting frame and which is movable in the longitudinal direction in response to the operation of said controller;

first biasing means disposed between said headlight mounting frame and said vehicle body for biasing said headlight mounting frame to pivot in one rotational direction;

a decorative member mounted to said vehicle outboard of and spaced from said headlight mounting frame, said member having a first aperture substantially coaxial with said headlight and a second aperture;

the improvement comprising:

an adjust screw having a hollow head portion adapted to receive a tool insertable through said second aperture and a threaded shank portion, said adjust screw having a coaxial through bore leading from said hollow head portion to the end of said threaded shank portion, said adjust screw being slidably disposed through a hole formed in said headlight mounting frame;

said wire being disposed through said through bore and formed with a nipple portion at one end thereof which is received in said hollow head portion;

a nut for threadedly receiving said threaded shank portion which is secured to the inboard surface of said headlight mounting frame.

* * * * *